United States Patent
Penta et al.

(10) Patent No.: US 11,315,551 B2
(45) Date of Patent: Apr. 26, 2022

(54) SYSTEM AND METHOD FOR INTENT DISCOVERY FROM MULTIMEDIA CONVERSATION

(71) Applicant: Accenture Global Solutions Limited, Dublin (IE)

(72) Inventors: Antonio Penta, Dublin (IE); Osama M. Mohamed, Dublin (IE); Anandita Pal, Dublin (IE); Hilary Allen, Dublin (IE); Hakan Ozkok, Dublin (IE); Stephen J. O'Kennedy, Dublin (IE); Onur Can Sert, Dublin (IE); Andreea-Roxana Miu, Dublin (IE)

(73) Assignee: ACCENT GLOBAL SOLUTIONS LIMITED, Dublin (IE)

( * ) Notice: Subject to any disclaimer, the term of this patent is extended or adjusted under 35 U.S.C. 154(b) by 171 days.

(21) Appl. No.: 16/742,508

(22) Filed: Jan. 14, 2020

(65) Prior Publication Data

US 2021/0142791 A1    May 13, 2021

Related U.S. Application Data

(60) Provisional application No. 62/931,862, filed on Nov. 7, 2019.

(51) Int. Cl.
  *G10L 15/18* (2013.01)
  *G10L 15/06* (2013.01)
  (Continued)

(52) U.S. Cl.
  CPC .......... *G10L 15/1815* (2013.01); *G06N 20/00* (2019.01); *G10L 15/063* (2013.01); *G10L 15/22* (2013.01)

(58) Field of Classification Search
  CPC ... G10L 15/1815; G10L 15/063; G10L 15/22; G06N 20/00
  See application file for complete search history.

(56) References Cited

U.S. PATENT DOCUMENTS

2012/0303559 A1*  11/2012  Dolan ............... G06N 20/00
                                                   706/12
2014/0108143 A1*  4/2014  Davitz ........... G06Q 30/0275
                                                   705/14.53
(Continued)

FOREIGN PATENT DOCUMENTS

| JP | 2000-067063 A | 3/2000 |
| JP | 2002-132766 A | 5/2002 |
| JP | 2018-151786 A | 9/2018 |

OTHER PUBLICATIONS

Office Action in Japan Application No. 2020-169168, dated Oct. 19, 2021, including English translation, 6 pages.

*Primary Examiner* — Michael Colucci
(74) *Attorney, Agent, or Firm* — Crowell & Moring

(57) ABSTRACT

This disclosure relates to systems and methods for discovering intents from multimedia conversations. In an implementation, the system may obtain an optimal parameter configuration based on a topic relevance quantifier. The system may extract topics from the audio calls based on the optimal parameter configuration. The system may determine respective context metrics for each of the topics. The system may select a relevant topic with respect to the intent discovery from the extracted topic based on the respective context metrics. The system may obtain documents associated with the relevant topic from the corpus of documents. The system may display information of the documents associated with the relevant topic via a user interface. The system may receive a feedback data with respect to the relevant topic. The system may determine intent information (Continued)

associated with the relevant topic based on the feedback data.

20 Claims, 8 Drawing Sheets

(51) Int. Cl.
    *G10L 15/22*     (2006.01)
    *G06N 20/00*     (2019.01)

(56) References Cited

U.S. PATENT DOCUMENTS

| | | | |
|---|---|---|---|
| 2015/0127591 A1 | 5/2015 | Gupta et al. | |
| 2016/0071510 A1* | 3/2016 | Li | G10L 13/027 |
| | | | 704/260 |
| 2016/0217790 A1* | 7/2016 | Sharifi | G10L 15/08 |
| 2017/0039297 A1* | 2/2017 | Koutrika | G06F 40/10 |
| 2018/0121415 A1* | 5/2018 | Perez | G10L 15/08 |
| 2018/0211223 A1* | 7/2018 | Jacobson | H04L 12/1831 |
| 2018/0349477 A1* | 12/2018 | Jaech | G06F 16/9535 |
| 2020/0105156 A1* | 4/2020 | Naidu | G09B 7/06 |
| 2020/0402015 A1* | 12/2020 | Ozcaglar | G06F 16/906 |

* cited by examiner

SYSTEM AND METHOD FOR INTENT DISCOVERY FROM MULTIMEDIA CONVERSATION

TECHNICAL FIELD

This disclosure relates to machine learning procedure for multimedia conversation and natural language processing, in particular, to discovery intent from multimedia conversation such as audio, web chat, and video.

BACKGROUND

Intent discovery systems may utilize supervised machine learning to perform natural language processing. Training procedure for supervised machine learning rely on subject matter experts (SME) to manually identify individual audio data and label them with intents, which are then used to adjust weights, biases, and other metrics in a machine learning model. Training often requires substantial effort by the subject matter experts to achieve acceptable model performance. Fatigue, user error, and other human limitations may inhibit model performance, prolong training, or render training unfeasible.

SUMMARY

This disclosure relates to systems and methods for discovering intents from multimedia conversation.

In one embodiment, a method for intent discovery is disclosed. The method may include receiving multimedia conversation. The method may include obtaining an optimal parameter configuration based on topic relevance quantifier. The topic relevance quantifier comprises a machine learning model trained to predict the optimal configuration to ensure the relevance of the extracted topics. The method may include processing the multimedia conversation based on the optimal parameter configuration by: converting the multimedia conversation to text information based on the optimal parameter configuration; normalizing, by a natural language processing mechanism, the text information into a corpus of documents based on the optimal parameter configuration; and extracting topics from the corpus of documents based on the optimal parameter configuration. The extracted topic is associated with a group of topic words. The method may include determining respective context metrics for each of the topics. The method may include selecting a relevant topic with respect to the intent discovery from the extracted topics based on the respective context metrics. The method may include obtaining documents associated with the relevant topic from the corpus of documents. The method may include display information of the documents associated with the relevant topic via a user interface. The method may include receiving a feedback data with respect to the documents associated with the relevant topic. The method may include determining intent information associated with the relevant topic based on the feedback data.

In another embodiment, a system for intent discovery is disclosed. The system may receive multimedia conversation. The system may obtain an optimal parameter configuration based on a topic relevance quantifier. The topic relevance quantifier may comprise a machine learning model trained to predict relevance of topics. The system may convert the multimedia conversation to text information based on the optimal parameter configuration. The system may normalize the text information into a corpus of documents based on the optimal parameter configuration. The system may extract topics from the corpus of documents based on the optimal parameter configuration. The topic may be associated with a group of topic words. The system may determine respective context metrics for each of the topics. The system may select a relevant topic with respect to the intent discovery from the extracted topics based on the respective context metrics. The system may obtain documents associated with the relevant topic from the corpus of documents The system may display information of the documents associated with the relevant topic via a user interface. The system may receive feedback data with respect to the documents associated with the relevant topic. The system may determine intent information associated with the relevant topic based on the feedback data.

In another embodiment, a non-transitory computer readable storage medium comprises computer executable instructions. The computer executable instructions, when executed by a processor, cause the processor to carry out the above method.

The above embodiments and other aspects and alternatives of their implementations are explained in greater detail in the drawings, the descriptions, and the claims below.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In various examples, the system and method may discover intent from a collection of multimedia conversations. This is done in various stages. In a first stage, topics are extracted from text or transcriptions of the multimedia conversations. Then relevant topics are selected from the extracted topics and used to discovery intents. Optionally, a selection of the relevant topics is used to create rules that will be used to discover refined intents. The optimal parameters of the system for topic extraction are found during a training stage. Exemplary implementations of various stages of the system are described in FIGS. 2-6 and the related discussion.

The intent discovery systems and methods described herein may provide various technical advancements. For example, the intent discovery system described herein may provide a framework to discover intent from audio calls to support the analysis of customers' needs. The intent discovery system may discover intents from unlabeled audio or text content based on unsupervised proximal and balanced topics detection supplemented with supervised rules-based intent refinement.

Another example of a technical advancement achieved by the system and method described herein is that intent is discovered by driving the supervision of the expert in a more useful way. The most informative topics will be selected based on metrics detailed later. Then, a SME or Business analyst may use the information provided by the selected topics to discover intents or to explore the documents with rules in order to discover more granular intents, i.e., refined intents.

The systems and methods described herein offer improvements over existing market solutions. The additional benefits, efficiencies, and improvements over existing market solutions are made evident in the systems and methods described below.

Figure 1:
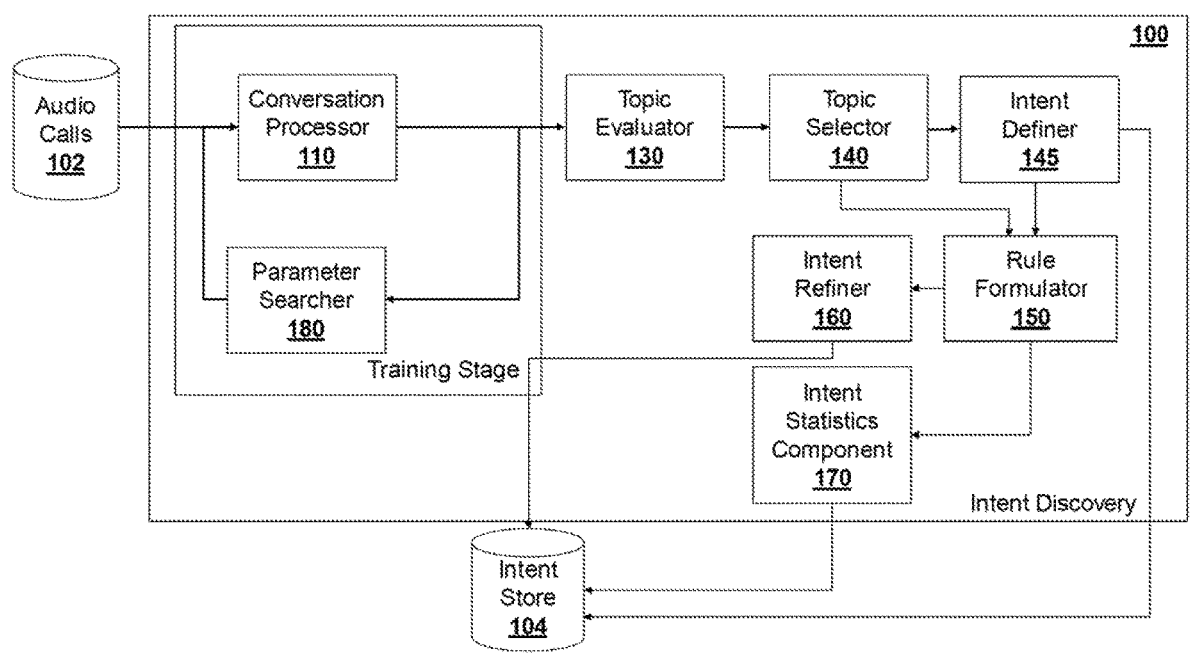
FIG. 1 illustrates a first example of a system for intent discovery.

FIG. 1 illustrates a first example of a system 100. The system 100 may discover intents from multimedia conversation. The multimedia conversation may include audio, voice chat, web chat, web transcriptions, video, and any other forms of applicable multimedia information. Herein, a collection of audio calls 102 are used as exemplary example of the multimedia conversation to describe various embodiments. The audio calls 102 may include content expressing intents of the speakers such as recordings of customer phone service conversations between customers and business representatives. The audio calls 102 can be stored electronically in various manners such as audio files, bulk data in a database, and the like. The system 100 may include a conversation processor 110, a topic evaluator 130, a topic selector 140, an intent definer 145, a rule formulator 150, an intent refiner 160, an intent statistics component 170, and a parameter searcher 180.

The conversation processor 110 of the system 100 may process the audio calls 102 to extract topics from the audio calls 102 based on a parameter configuration file. The functionality of the conversation processor 110 will be described in detail with reference to FIG. 2.

Figure 2:
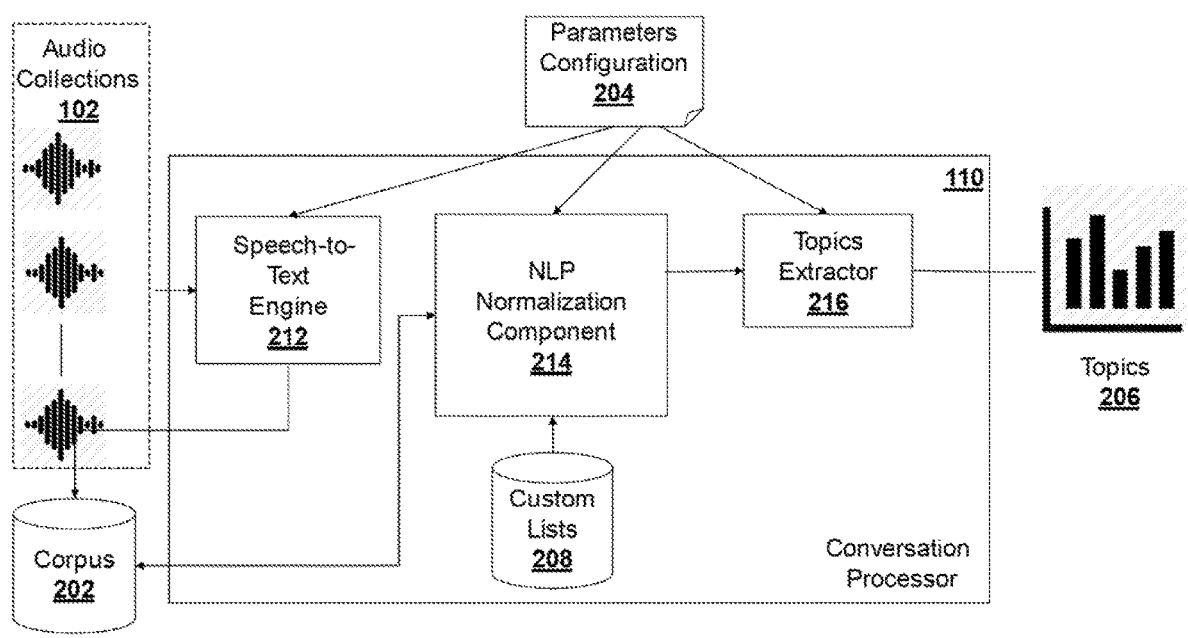
FIG. 2 illustrates an example of audio calls processing.

As illustrated in FIG. 2, the conversation processor 110 may include a speech-to-text engine 212, a natural language processing (NLP) normalization component 214, and a topics extractor 216. The parameter configuration 204 may include all processing parameters to be used by the conversation processor 110 and the values of the parameters. The parameter configuration 204 may be configured using a structural or semi-structural parameter configuration file including default settings. Additionally or alternatively, the parameter configuration 204 may be defined by a data scientist. Additionally or alternatively, the parameter configuration 204 may be provided by the parameter searcher 180 which will be described in detail later.

The speech-to-text engine 212 may perform speech recognition on the audio calls 102 and translate the speech information into text information based on parameters for the speech-to-text engine 212 configured in the parameter configuration 204. The parameters for the speech-to-text engine 212 may, for example, include sample rates and audio filters based on the length of the audio call, and the like. The text information may be stored in, for example, the corpus database 202.

The NLP normalization component 214 may apply normalization NLP procedures to the text information based on parameters for the NLP normalization component 214 configured in the parameter configuration 204, so as to generate a corpus of normalized conversation documents corresponding to the audio calls 102. The normalization NLP procedures may include removing stop-words and noise words, assigning Part-Of-Speech (PoS) tags, recognizing entities, and the like.

In some implementations, the NLP normalization component 214 may further extract a multidimensional feature, also referred to as word embedding, for each word within the conversation documents. The word embedding may represent a meaning of the word in a distributional semantic space. The word embeddings and other annotations may be stored in a dictionary format in the corpus 202 or other databases. The parameters for normalization NLP procedures and word embedding extraction may, for example, include selection of filters based on regular expressions and PoS tags, minimum count value for considering the words, window size for the embeddings, and type and size of embeddings, and the like.

The topics extractor 216 may process the normalized conversation documents to extract the topics 206, based on parameters for the topics extractor 216 configured in the parameter configuration 204. The parameters may include, for example, the number of topics to be extracted, the number of iterations for the topic extraction, the number of passes for the topic extraction, and the like. The topic 206 may include a group of words in the normalized conversation documents. The topics 206 may be stored in a topics store, which may include information about the words for each topic and the topics associated to each normalized conversation document.

The topic evaluator 130 and the topic selector 140 function collaboratively to select relevant topics with respect to the intent discovery from the topics extracted by the topics extractor 216. Specifically, the topic evaluator 130 may measure the context metric for each of the extracted topics 206. The context metric may comprise the proximity score and the balance score. The proximity score may indicate how spatially close are the topic words of the topic within the normalized conversation documents. That is, how the words in a given topic are connected in the conversation documents. The balance score may indicate how the topic word of the topic represents enough information to understand the specificity of an intent within the context of the normalized conversation documents. The topic selector 140 may select the relevant topics from the topics extracted by the topics extractor 216 based on the proximity scores and the balanced scores of the extracted topics. Exemplary functionality details of the topic evaluator 130 and the topic selector 140 will be described with reference to FIG. 3 as below.

Figure 3:
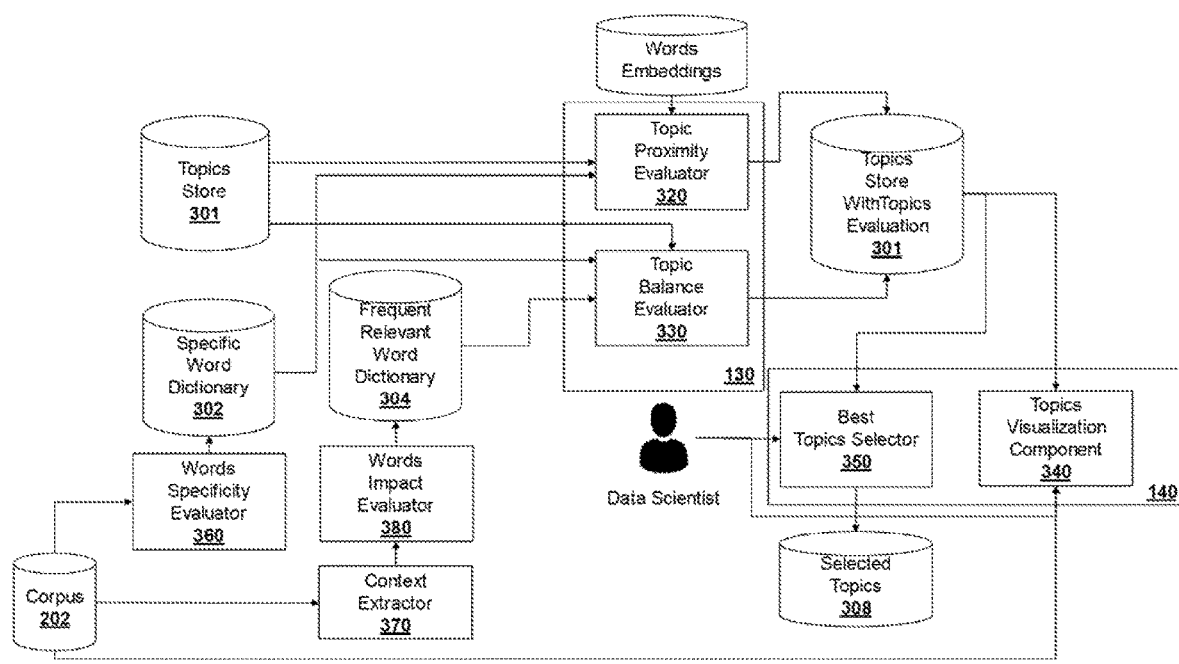
FIG. 3 illustrates an example of topic evaluation and selection.

As illustrated in FIG. 3, the topic evaluator 130 may include a topic proximity evaluator 320 and a topic balance evaluator 330. The extracted topics 206 may be stored in the topics store 301. The topic proximity evaluator 320 may retrieve the topics 206 from the topics store 301 and measure the proximity score for each of the topics based on the word embeddings extracted by NLP normalization component 214 and the word specificity scores in the specific word dictionary 302. The topic proximity evaluator 320 may store the proximity scores of the topics in the topic store 301.

An example of proximity score between two words $w_i$ and $w_j$, may be calculated as follows:

$$\frac{\sum_i \sum_{j \neq i} Coh(w_i, w_j) * \max(RIDF(w_i), RIDF(w_j))}{2 * C_2^N}$$

where:

Coh($w_i$, $w_j$) is the cosine similarity between the embedding of $w_i$ and $w_j$, RIDF(w) is the Residual Inverse Document Frequency (RIDF) of the word w, and $C^N_2$ is the binomial coefficient.

The proximity score for a topic T is a combination of the above scores computed among the Top-K words related to T, for example using an average function as combination.

The specific word dictionary 302 may be provided by the words specificity evaluator 360. In an implementation, the words specificity evaluator 360 may retrieve the normalized conversation documents from the corpus database 202 and calculate for each word in the normalized conversation documents a specificity score that is related to its domain specificity. The specificity scores may be used to understand what are the words that are relevant to the business domain within the topic. Ultimately, words specificity evaluator 360 stores the scores in the specific word dictionary 302. An example of word specificity score for a topic T is calculated based on the uniqueness of the Top-K words belonging to T, example of uniqueness measures are the RIDF used in natural language processing.

The topic balance evaluator 330 may retrieve the topics 206 from the topics store 301 and calculate the balance score for each of the topics based on the specific word dictionary 302 and the frequent relevant word dictionary 304. The balance score measures how the topic words in a given topic are balanced with respect to domain-specific words and frequent relevant words. The topic balance evaluator 330 may store the balance scores of the topics in the topic store 301.

An example of the balance score for a topic T is described as follows:

Balance(T)=S_TF_RIDF+boost_IDF+boost_Impact where:

S_TF_RIDF is the sum of the TF-RIDF scores for the Top-K words, TF-RIDF is the multiplication between the Term Frequency (TF) and the RIDF scores;

boost_IDF is a percent of the Inverse Document Frequency (IDF) averaged among the Top-K words; and boost_Impact is a percent of impact score, for example the Prevalent Association Lift (PAL) score detailed later, which takes into account how the Top K words of the topic T are impactful in the conversation data.

The frequent relevant word dictionary 304 may be provided by the collaboration of the context extractor 370 and the words impact evaluator 380. In an implementation, the context extractor 370 may extract a sliding window of words for each sentence within the conversation. The extracted windows are used to compute the context for each word, which is the made by the set of words that are close to the selected word considering the extracted windows. The context is used from the normalized conversation documents with predetermined parameter settings to compute the impact score.

The words impact evaluator 380 may utilize the context of each of the words extracted by the context extractor 370 to measure the impact that the word has in the normalized conversation documents. An high impact score means that the word will direct the flow of the conversations. The words impact evaluator 380 may calculate the impact score by measuring the association between two closest words in the extracted contexts. The words that have a higher impact are the frequent words that have stronger associations with other words within the conversations. Ultimately, the words impact evaluator 380 may store the impact scores of the words in the frequent relevant word dictionary 304.

An example of the impact score is the one based on the PAL:

$$PAL(w_l, w_r) = \frac{S(w_l \to w_r)}{\sqrt{S(w_l) + S(w_r)}}$$

where:

S(w) is the support of the word w, which is equal to $$\frac{count(w)}{N},$$

and N is the number of associations extracted from the contexts; and $S(w_l \to w_r)$ is the support of the associations ($w_l \to w_r$), which is equal to $$\frac{count(w_l \to w_r)}{N},$$

and N is the number of associations extracted from the contexts, where count($w_l \to w_r$) means number of times $w_l$ is followed by $w_r$.

For example, an impact score could be computed using the PAL score and selecting the left words in it that have the highest PAL value.

Continuing with reference to FIG. 3, the topic selector 140 may include a topics visualization component 340. The topics visualization component 340 may implement an interactive search for a user such as a data scientist, for example, via a graphical user interface. For example, the user may first input a text query. The text query can be automatically computed by the user's selecting the words in the topic using Part of Speech tags, the specificity scores and the impact scores of the words. Alternatively, the text query may be defined directly by the user. In response to receiving the text query, the topics visualization component 340 may utilize the text query to search the normalized conversation documents for text segments including the words in the text query. Then, the topics visualization component 340 may display the text segments related to the topic via the graphical user interface. The display of the text segments related to the topic may assist the user to make a determination on whether this topic is a relevant topic. The topics visualization component 340 may receive the determination of the user via the graphical user interface.

Here, the topics visualization component 340 offers an interactive search for the data scientist to retrieve segments of text using words within a topic. Reading the text segments helps them to better select the relevant topics in combination with the context metrics of the topics.

Alternatively or additionally, the topic selector 140 may include a best topics selector 350. As an example, the best topics selector 350 may retrieve the extracted topics from the topic stores 301 and display information of all the extracted topics including the proximity scores and the balance scores of the topics via the graphical user interface. Both the proximity score and the balance score facilitate the comprehension of the topic by the user. In this way, the user may rank the topics based on the proximity scores and the balance scores. The best topics selector 350 may select the topics ranked above a predetermined threshold value as the relevant topics. Alternatively, the user may directly select a portion of the topics as the relevant topics based on the displayed information on the topics. The best topics selector 350 may receive such selection via the user graphical interface.

As discussed above with reference to FIG. 3, another example of a technical advancement achieved by the system and method described herein is the selection of relevant topics to inform intent discovery based on the proximity scores and the balance scores of the topics.

Returning to FIG. 1, the intent definer 145 may determine the intent information association with the relevant topics. For example, the intent definer 145 displays the relevant topics to the user such as a SME via a graphic user interface. The user may input an intent name for each of the relevant topics. As such, the intent definer 145 may label the relevant topics with the corresponding intent names.

Optionally, if a relevant topic with the intent name, for example, "Baggage Queries" is associated with a great deal of normalized conversation documents, for example, 10% of all normalized conversation documents, the intent definer 145 may display the relevant topic and the conversation documents associated with the relevant topic to the user via the graphical user interface. By reviewing the relevant topic and the associated conversation documents, the user may determine that an intent refinement is necessary to discover sub-intents, also referred to as refined intents, for the relevant topic. As a result, the intent definer 145 may trigger the intent refinement process performed by the intent formulator 150 and the intent refiner 160.

The rule formulator 150 and the intent refiner 160 function collaboratively to refine intents for relevant topics. Specifically, the rule formulator 150 may obtain a set of query rules corresponding to a relevant topic. The query rule may be defined as a set of topic words in the relevant topic in combination with logical operators like and, or, not. The intent refiner 160 may utilize each of the query rules as query text to retrieve respective conversation documents corresponding to the query rule from the corpus of normalized conversation documents or original conversation transcripts and identify refined intents contained in the respective retrieved conversation documents with the assist of the user such as a business analyst or a SME in a business. Furthermore, the intent statistics component 170 may perform various statistical operations with respect to the identified intents based on the query rules. Exemplary functionality details of the rule formulator 150, the intent refiner 160, and the intent statistics component 170 will be described with reference to FIG. 4 as below.

In an embodiment, the rule formulator 150 may be implemented as the rule discovery component 410. Specifically, the rule discovery component 410 may find a set of query rules describing each of the topics based on their PoS tags as well as scores like impact and proximity. The query rules can be expanded using semantic relatedness words such as synonymous extracted from an ontology store 408 that may include domain information. An example of extracted rule may be the logic combination of the selected words plus related words extracted from the ontology store 408.

In another embodiment, the rule formulator 150 may be implemented as the rule definition component 420. Specifically, the rule definition component 420 may, for example, interact with the user such as a business analyst or a SME. The user may manually define the query rules for each of the relevant topics based on the information included in the relevant topics. Then, the rule definition component 420 may receive the query rules defined by the user, for example, via a user graphical interface.

Figure 4:
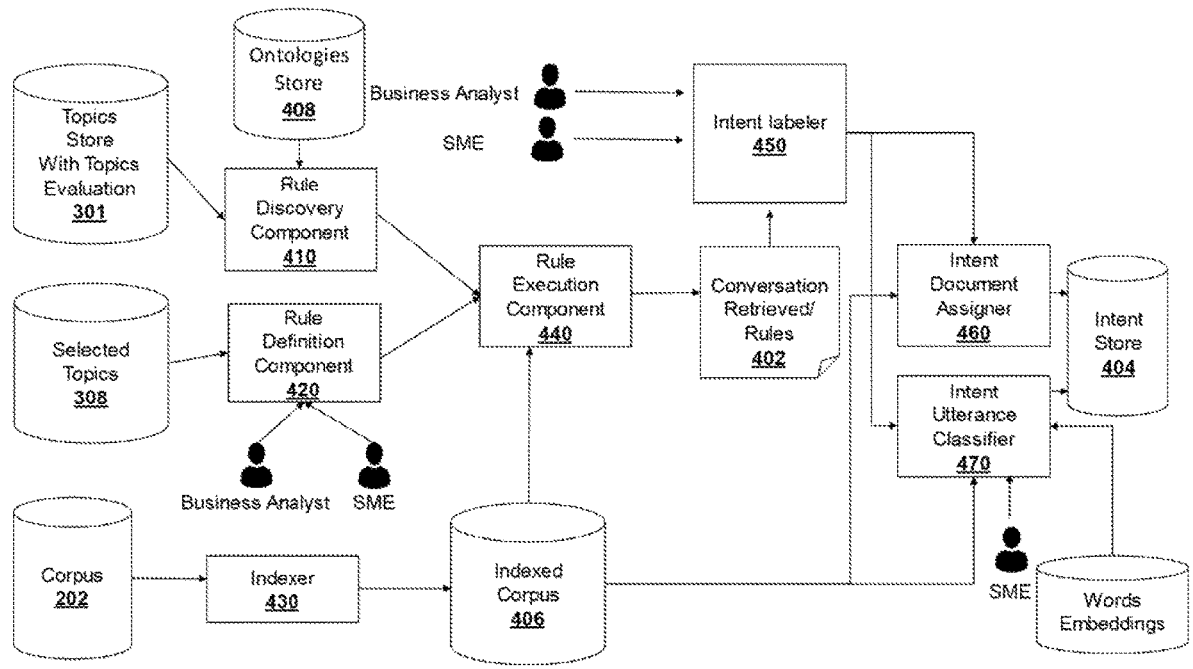
FIG. 4 illustrates an example of rule formulation and intent refinement.

The intent refiner 160 may include the rule execution component 440 and the intent labeler 450 as shown in FIG. 4. The rule execution component 440 may utilize each of the query rules obtained from the rule formulator 150 to retrieve conversation documents 402 corresponding to the query rule from the indexed corpus of conversation documents 406. For example, the rule execution component 440 may utilize the topic words in the query rule as key words or phrases to retrieve the conversation documents 402 from the indexed corpus 406. In some implementations, the rule execution component 440 may further rank the retrieved conversation documents 402 based on how the query words in the query rule are relevant to the retrieved conversation documents 403.

The indexed corpus 406 may be provided by the indexer 430. Specifically, the indexer 430 may index each of the normalized conversation documents and the original conversation transcripts in the corpus 202 by words in the documents and generate the indexed corpus of conversation documents 406.

The intent labeler 450 may label the query rules with the names of corresponding refined intents with the assist of the user such as a SME or a business analyst. For example, the intent labeler 450 displays three query rules describing the relevant topic labelled with the intent name "Baggage Queries" to the user via the user graphical interface. The user designates different refined intents for the three query rule, for example, baggage allowance, lost baggage, and damaged baggage. As a result, the intent labeler 450 labels the three query rules with "Baggage Allowance," "Lost Baggage," and "Damaged Baggage" respectively.

Through the intent refinement, a general intent may be split into more granular intents. For example, the intent of "Baggage Queries" is split into three refined intents of "Baggage Allowance," "Lost Baggage," and "Damaged Baggage." In addition, the execution of the query rules helps understand how the conversation documents associated with a general "Baggage Queries" intent map to the refined intents. As such, an intent hierarchy is formed.

It is likely that any individual conversation document 402 may be retrieved by the execution of more than one rule query, as the conversation document may express more than one intent. Thus, the intent document assigner 460 may assign the conversation document 402 to multiple intents and store the conversation document 402 to the intent store 404 together with the intent assignment information for multiple intents. In some implementations, if the rule execution component 440 provides a ranking score with respect to the execution of each query rule, the ranking score of the conversation document 402 with respect to each intent will also be stored in the intent store 404. In this way, it will be easier to compute useful statistics such as how many conversations in the audio collections are associated with each intent and which intent should be considered the primary intent that the conversation is aligned to.

The intent utterance classifier 470 may implement an interactive way for the user such as a SME to inspect the retrieved conversation documents 402 with respect to intent and highlight a set of text segments in the conversation documents 402 that clearly express such intent. As such, the intent utterance classifier 470 may train a text classifier using the textual features for the retrieved conversation documents 402 and the highlighted text segments such that the text classifier can classify all the text segments in the retrieved conversation documents 402 that contain the utterance related to the intent.

As discussed above with reference to FIG. 4, another example of a technical advancement achieved by the systems and methods described herein is the intent collection with informed supervision.

Returning to FIG. 1, the parameter searcher 180 may provide an optimal parameter configuration to the conversation processor 110 such that the conversation processor 110 may extract topics that are more useful in the intent discovery using the optimal parameter configuration. For example, in comparison with a topic including the words "he, she, it," the topic including the words "account, balance" is more relevant in discovering intent. From the intent discovery perspective, the topic including the words "he, she, it" would be noise, which is not expected to be extracted by the conversation processor 110. During the training stage, the search of an optimal parameter configuration by the parameter searcher 180 will be described in detail with reference to FIG. 5.

Figure 5:
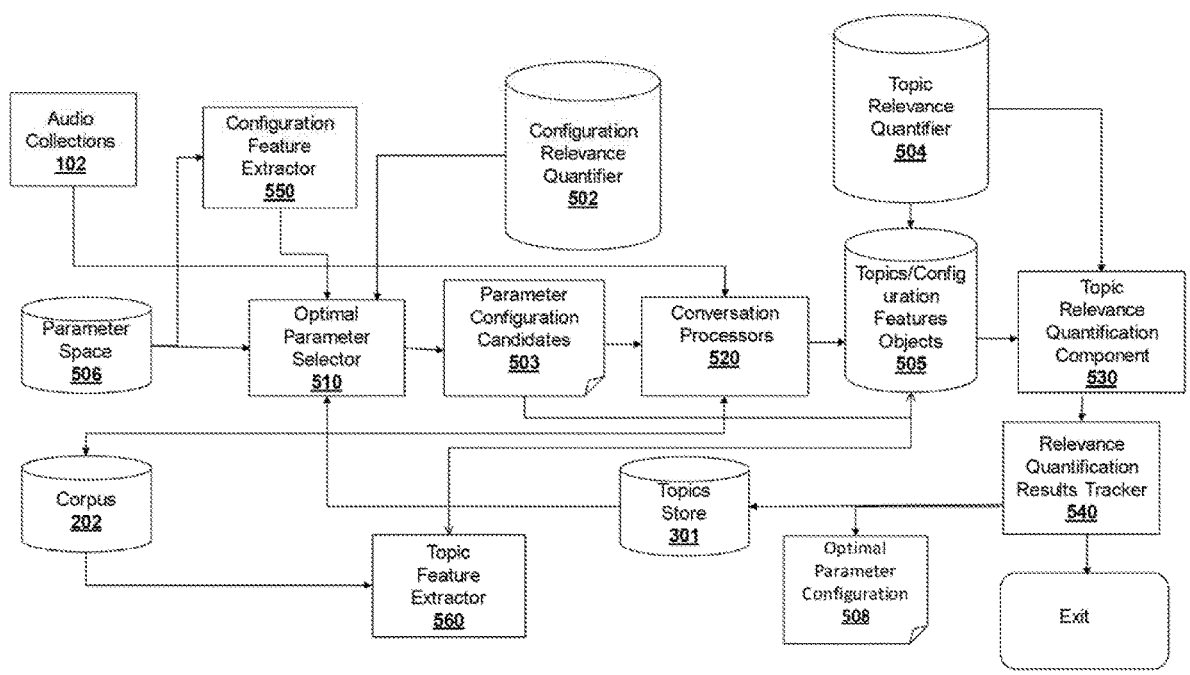
FIG. 5 illustrates an example of optimal parameter configuration search.

As shown in FIG. 5, the parameter searcher 180 may include the optimal parameter selector 510, the conversation processors 520, the topic relevance quantification component 530, the relevance quantification results tracker 540, the configuration feature extractor 550, and the topic feature extractor 560.

The configuration feature extractor 550 may extract a set of features that represent values of the parameters defined in the parameter space 506.

The optimal parameter selector 510 may explore the parameter space 506 extracting a set of parameter configuration candidates 503 using the parameter features extracted by the configuration feature extractor 550 and the configuration relevance quantifier 502. The configuration relevance quantifier 502 comprises a machine learning model trained to predict the impact of the candidate parameter configuration on the relevance of the topics extracted using such parameter configuration. The configuration relevance quantifier 502 is trained based on the previously explored parameter configurations. The mechanism to train the configuration relevance quantifier 502 will be described in detail later.

With the aid of the configuration relevance quantifier 502, instead of exploring all the possible parameter configurations or just a random selection of the possible parameter configurations, the optimal parameter selector 510 may be able to predict what are the parameter configurations that could be used to extract the most likely relevant topics.

The conversation processors 520 function in a similar way to the conversation processor 110 in FIG. 2. Specifically, the conversation processors 520 may convert the audio collections 102 to the text information based on the respective parameter configuration candidates 503, normalize the text information into a corpus of documents based on the respective parameter configuration candidates 503, generate a set of word embeddings for words in the corpus of documents, and extract a set of topics from the corpus of documents based on the respective parameter configuration candidates 503.

The topic feature extractor 560 may extract multidimensional features for each topic extracted by each of the conversation processors 520. In particular, the topic feature extractor 560 extracts such multidimensional features for the topic for example by aggregating the word embeddings associated to each word belonging to the topic.

As shown in FIG. 5, with the topics/configuration features objects 505 as input, which include the extracted topics by each of the conversation processors 520, the multidimensional features for the extracted topics, and the parameter configuration candidates 503, the topic relevance quantification component 530 may utilize the topic relevance quantifier 504 to measure the relevance of the extracted topics, which may be represented as, for example, relevance scores in the integer interval between 0 and 5, where 0 means not relevant and 5 means very relevant. The topic relevance quantifier 504 comprises a machine learning model trained to predict the relevance of a topic to the intent discovery based on parameter configurations. The topic relevance quantifier 504 is trained based on the previous extracted topics from the audio collections 102. The mechanism to train the topic relevance quantifier 504 will be described in detail later.

For each of the parameter configuration candidates 503, the relevance quantification results tracker 540 may compare the relevance scores of the topics extracted based on the parameter configuration candidate to predetermined relevance criteria so as to determine whether the relevance criteria is satisfied. For example, if 90% of the relevance scores have reached the target relevance threshold, the relevance quantification results tracker 540 may determine that the relevance criteria is satisfied by the parameter configuration candidate. As a result, among the parameter configuration parameters satisfying the relevance criteria, the parameter configuration candidate with highest relevant score can be selected as the optimal parameter configuration 508 to discover intents in the system 100.

On the other hand, if the relevance quantification results tracker 540 determines that the relevance criteria is not satisfied by any of the parameter configuration candidates 503, it will trigger the optimal parameter selector 510 to select another set of parameter configuration candidates 503. As such, a closed loop is formed to automatically explore the parameter space 506 for the parameter configuration candidates until the relevance criteria is satisfied.

Additionally, the relevance quantification results tracker 540 may check if the topic relevance quantifier 504 is still able to classify the topics with good accuracy. If the relevance quantification results of the extracted topics start to deviate from a base accuracy, i.e., the topic relevance quantifier 504 is not able to generalize well enough on new topics, the relevance quantification results tracker 540 will stop the closed loop. As such, the topic relevance quantifier 504 and the configuration relevance quantifier 502 may need further training to improve the accuracy.

As discussed above with reference to FIG. 5, another example of a technical advancement achieved by the systems and methods described herein is finding optimal parameter configurations for topic extraction by predicting their impacts using the topic relevance quantifier and the parameter configuration relevance quantifier.

Now, the mechanism to train the topic relevance quantifier 504 and the configuration relevance quantifier 502 will be described with reference to FIG. 6.

Figure 6:
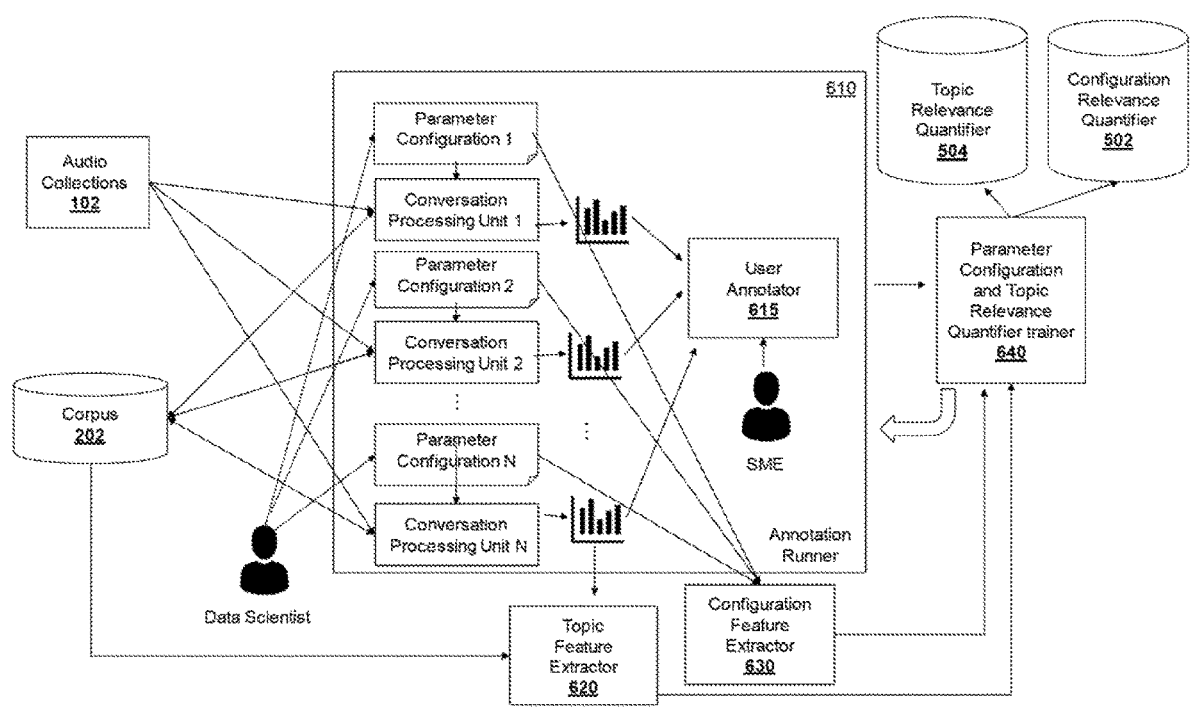
FIG. 6 illustrates an example of training for topic relevance quantifier model and parameter configuration relevance quantifier models.

As shown in FIG. 6, the annotation runner 610 is a meta-component comprising a plurality of conversation processing units, i.e., conversation processing units 1 through N, and the user annotator 615. The plurality of conversation processing units can run in parallel to process the audio collections 102 with respective parameter configuration files, i.e., the parameter configuration files 1 through N. These parameter configuration files may be selected by the user such as the data scientist at the beginning of running the annotation. Alternatively or additionally, these parameter configuration files may be pre-selected according to a predetermined selecting rule.

The conversation processing units 1 through N function in a similar way to the conversation processing unit 110 in FIG. 2. Taking conversation processing unit 1 as an example, the conversation processing unit 1 may convert the audio collections 102 to a training text information based on the parameter configuration file 1, normalize the training text information to a training corpus of documents based on the parameter configuration file 1, generate a training set of word embeddings for words within the training corpus of documents, and then extract a training set of topics from the training corpus of documents based on the parameter configuration file 1.

All the topics extracted by the conversation processing units 1 through N may be input into the user annotator 615. The user annotator 615 may, for example, display these topics to the user such as a SME via a graphical user interface. In this way, the user may annotate the relevance of each topic to the intent discovery. For example, the user may assign a numerical score to each topic which represents the relevance of the topic to the intent discovery.

It should be noted that the annotation runner 610 may keep operating with different parameter configuration files as needed. In this way, the annotation runner 610 may output more topics annotated by the user for the subsequent training of the parameter configuration quantifier 502 and the topic relevance quantifier 504.

Functioning in a similar way to the topic feature extractor 560 in FIG. 5, the topic feature extractor 620 may extract multidimensional features for each topic extracted by the conversation processing units of the annotation runner 610 using the training set of word embeddings. Also, functioning in a similar way to the configuration feature extractor 550 in FIG. 5, the configuration feature extractor 630 may extract a set of features that represent values of the parameters defined the parameter configuration files 1 through N.

With the topics annotated with scores by the user annotator 615, the features of the topics extracted by the topic feature extractor 560, and the features of the parameter configuration files extracted by the configuration feature extractor 550, the parameter configuration and topic relevance quantifier trainer 640 may train two machine learning models, the topic relevance quantifier 504 and the configuration relevance quantifier 502, by learning the annotated relevance of the topics and the corresponding parameter configuration files. A variety of applicable machine learning models may be adopted to train the topic relevance quantifier 504 and the configuration relevance quantifier 502, including, for example, artificial neural networks, decision trees, support vector machines, and the like.

Specifically, with annotated scores of the topics and the features of the topics as input, the topic relevance quantifier 504 may be trained to learn if a set of topics are relevant. With annotated scores of the topics, the context metrics of the topics stored in the topics store 301, and the parameter features of corresponding parameter configuration files as input, the configuration relevance quantifier 502 may be trained to learn if a parameter configuration file can be used to extracted relevant topics from the audio collections 102.

The parameter configuration and topic relevance quantifier trainer 640 may contain a loop in which the model topic relevance quantifier 504 and the model configuration relevance quantifier 502 may be released if their classification accuracy reaches a predefined threshold. Otherwise, the annotation runner 610 will instantiate more conversation processing units with different parameter configuration files such that more topics can be extracted for the annotation by the user, and then be used to train the topic relevance quantifier 504 and the configuration relevance quantifier 502.

Here, instead of requiring the user to label individual topics with intents as done in the traditional intent discovery approaches, the present disclosure simply asks the user to determine whether the topics are relevant to the intent discovery, for example, by annotating each topic with a relevant score as discussed above. An example of relevant scores may be an integer between 0 and 5, where 0 means not relevant and 5 means very relevant. Through utilizing the model topic relevance quantifier 504 and the configuration relevance quantifier 502 in searching optimal parameter configuration 508 as discussed with reference to FIG. 5, the optimal parameter selection process may be embedded with human insight.

Various components in the system 100 as illustrated in FIGS. 1 through 6 are discussed above. However, the system 100 may be implemented with additional, different, or fewer components than illustrated. Each component may include additional, different, or fewer components.

Figure 7:
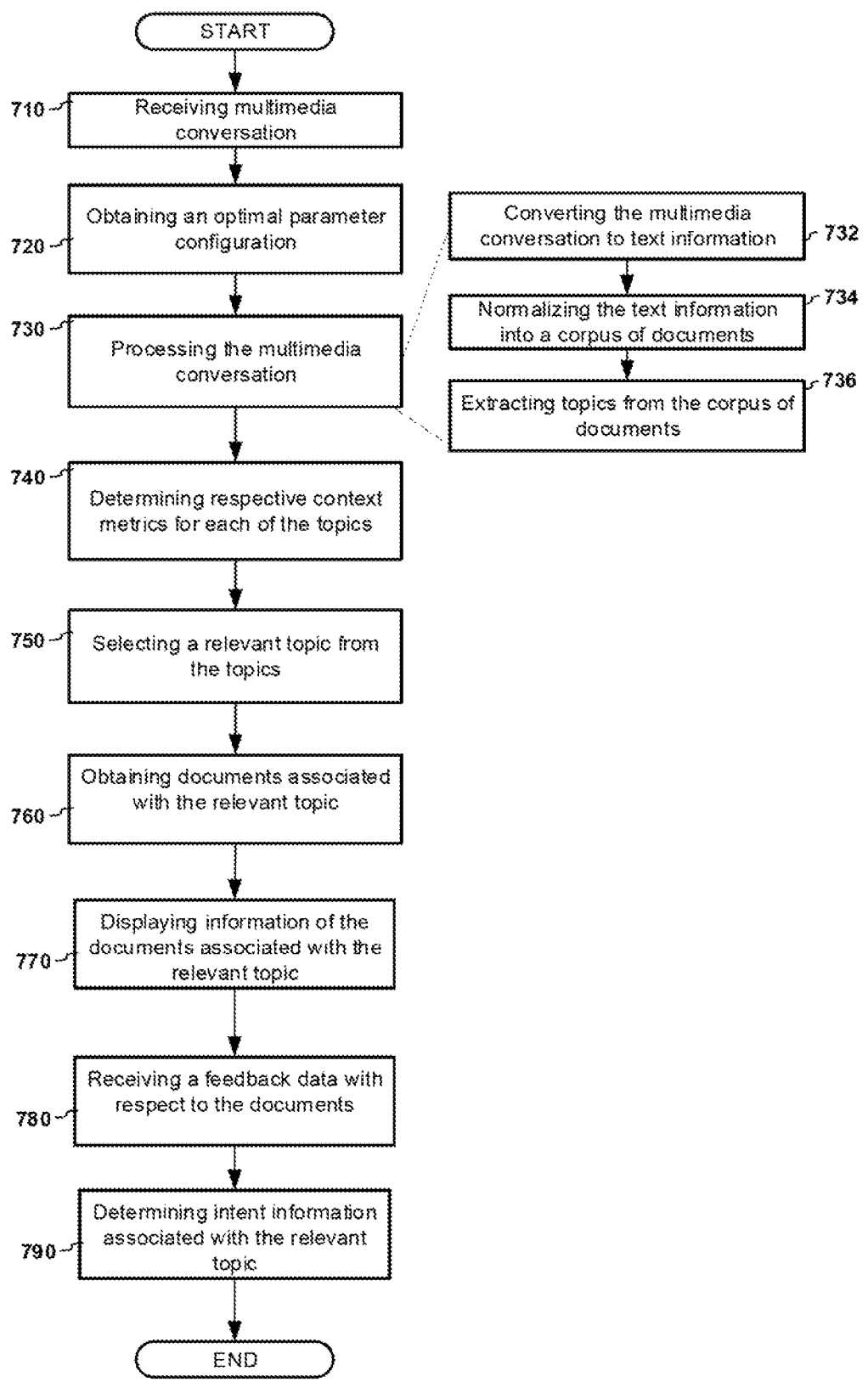
FIG. 7 illustrates a flow diagram of a system.

FIG. 7 illustrates a flow diagram for the system 100. The steps may include additional, different, or fewer operations than illustrated in FIG. 7. The steps may be executed in a different order than illustrated in FIG. 7.

In the embodiment as illustrated in FIG. 7, the system 100 may receive multimedia conversation (710). The multimedia conversation may be, for example, audio calls including content expressing intents of the speakers such as recordings of customer phone service conversations between customers and business representatives. The multimedia conversation may be communicated to the system 100 via the application programming interface, a message broker, representational state transfer (REST), and/or some other suitable communication technology.

The system 100 may obtain an optimal parameter configuration based on a topic relevance quantifier (720). The optimal parameter configuration may include various parameters that can be used to extract relevant topics from the multimedia conversation. The topic relevance quantifier comprises a machine learning model trained to predict relevance of topics. For example, the system 100 performs the optimal parameter configuration search process as discussed above with reference to FIG. 5. During this process, the topic relevance quantifier measures the relevance of the topics extracted through a candidate parameter configuration. When the relevance of the topics meets a relevance criteria, the system 100 sets the candidate parameter configuration as the optimal parameter configuration. Otherwise, the system 100 will search for the next candidate parameter configuration until the relevance criteria is met.

The system 100 may process the multimedia conversation such as the audio calls based on the optimal parameter configuration (730) by performing steps 732 through 736. By way of example, the system 100 utilizes a speech-to-text engine to convert the audio calls to text based on the optimal parameter configuration (732). Then, the system 100 normalizes the text into a corpus of documents based on the optimal parameter configuration using a natural language processing engine (734). The system 100 may process the text by applying classical normalization NLP procedures including, for example, removing stop-words and noise words, assigning Part-Of-Speech tags, recognizing entities, and the like. After that, the system 100 extracts topics from the corpus of documents based on the optimal parameter configuration (736). The topics may be represented as topics data structure which contains information about the words for each topic and the topics associated with each document.

Then, the system 100 may determine respective context metrics for each of the topics extracted at step 736. For example, the context metrics include proximity score and balance score for the topic. The proximity score indicates how spatially close are the topic words of the topic within the corpus of documents. The balance score indicates how the topic word of the topic represents enough information to understand the specificity of intent within the context of the corpus of documents.

The system 100 may select a relevant topic with respect to the intent discovery from the extracted topics based on the context metrics (750). For example, the system 100 may select the topic with the highest proximity score and balance score as the relevant topic. For another example, the system 100 may display the topics to the user such as a data scientist together with their proximity scores and balance scores and determine which topic is the relevant topic with the assist of the user.

The system 100 may obtain documents associated with the relevant topic from the corpus of documents normalized at step 734 (760). For example, the system 100 may search the corpus of documents for the documents containing the topic words associated with the relevant topic.

The system 100 may display information on the documents associated with the relevant topic via a user graphical user interface (770). For example, the system 100 displays the whole text of each document. For another example, the system 100 displays multiple text segments of each document. The multiple text segments include the topic words of the relevant topic.

The system 100 may receive feedback data with respect to the conversation documents associated with the relevant topic (780). For example, with the inspection of the displayed text or text segments, the user determines whether these documents clearly express an intent corresponding to the relevant topic. If such intent presents, the user will input a name of the intent as the feedback data. Optionally, if the relevant topic is associated with a great deal of conversation documents, for example, 10% of all conversation documents, it indicates that the intent corresponding to the relevant topic is general and an intent refinement is necessary to discover sub-intents for the relevant topic. By reviewing the relevant topic and the displayed conversation documents associated with the relevant topic, the user may for example define a set of query rules as the sub-topics of the relevant topic and designate different sub-intents for the query rules, as discussed above with reference to FIG. 4. As such, the feedback data may include the names of the sub-intents.

The system 100 may determine intent information associated with the relevant topic based on the feedback data (790). For example, the system 100 labels the relevant topic with the intent name. Alternatively or additionally, if the system 100 perform the intent refinement for the relevant topic, the system 100 labels each of the query rules corresponding to the relevant topic with the respective sub-intent names. Furthermore, the system 100 may find the related utterances expressing the intent or the sub-intents in the documents. For further example, the system 100 can compute various useful statistics such as how many of audio calls are directed to this intent.

Figure 8:
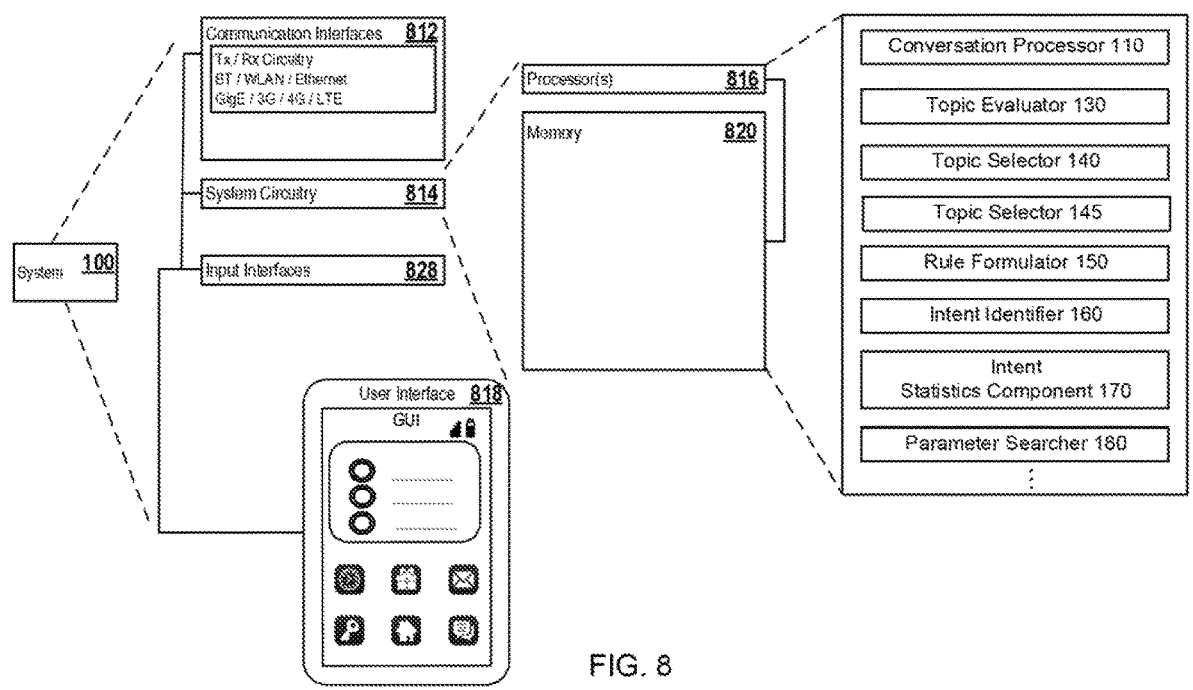
FIG. 8 illustrates a second example of a system for intent discovery.

FIG. 8 illustrates another example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the conversation processor 110, the topic evaluator 130, the topic selector 140, the rule formulator 150, the intent refiner 160, the intent statistics component 170, the parameter search 180, and/or the system 100. In addition, the processor 816 may be caused to perform the operations of speed-to-text engine 212, the NLP normalization component 214, and/or the topics extractor 216 for audio calls processing, the operations of topic proximity evaluator 320, the topic balance evaluator 330, the topics visualization component 340, the best topics selector 350, the words specificity evaluator 360, the context extractor 370, and/or the words impact evaluator 380 for topic selection; the operations of the rule discovery component 410, the rule definition component 420, the rule execution component 440, the indexer 430, the intent labeler 450, the intent document assigner 460, and/or the intent utterance classifier 470 for rule formulation and intent refinement; the operations of configuration feature extractor 550, optimal parameter selector 510, the conversation processor 520, the topic relevance quantification component 530, the relevance quantification results tracker 540, and/or the topic feature extractor 560 for the optimal parameter configuration search; the operations of annotation runner 610, the user annotator 615, the topic feature extractor 620, the configuration feature extractor 630, and/or the parameter configuration and topic relevance quantifier trainer 640 for training the parameter configuration relevance quantifier and the topic relevance quantifier. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the conversation processor 110, the topic evaluator 130, the topic selector 140, the rule formulator 150, the intent refiner 160, the intent statistics component 170, the parameter search 180, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the conversation processor 110, the topic evaluator 130, the topic selector 140, the intent definer 145, the rule formulator 150, the intent refiner 160, the intent statistics component 170, the parameter search 180, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for intent discovery, comprising:
   receiving multimedia conversation;
   obtaining an optimal parameter configuration based on a topic relevance quantifier, the topic relevance quantifier comprising a machine learning model trained to predict relevance of topics;
   processing the multimedia conversation based on the optimal parameter configuration by:
      converting the multimedia conversation to text information based on the optimal parameter configuration;
      normalizing, by a natural language processing mechanism, the text information into a corpus of documents based on the optimal parameter configuration; and
      extracting topics from the corpus of documents based on the optimal parameter configuration, the topic associated with a group of topic words;
   determining respective context metrics for each of the topics;
   selecting a relevant topic with respect to the intent discovery from the extracted topics based on the respective context metrics;
   obtaining documents associated with the relevant topic from the corpus of documents;
   displaying information of the documents associated with the relevant topic via a user interface;
   receiving, from a graphical user interface accessible by a subject matter expert, a feedback data with respect to the documents associated with the relevant topic, the feedback data comprising sub-topics of the relevant topic and sub-intents for the sub-topics input into the graphical user interface by the subject matter expert; and
   determining intent information associated with the relevant topic based on the feedback data.

2. The method of claim 1, wherein the context metrics comprise a proximity score, and the determining the respective context metrics for each of the topics comprises:
   determining respective proximity scores for each of the topics, the proximity score indicative of a spatial proximity between topic words associated with the topics within the corpus of documents.

3. The method of claim 2, wherein the context metrics further comprises a balance score, and the determining the respective context metrics for each of the topics further comprises:
   determining respective balance scores for each of the topics, the balance score indicative of an intent specificity of topic words associated with the topic within context of the corpus of documents.

4. The method of claim 3, wherein the determining the respective proximity scores for each of the topics comprises:
   determining respective domain specificity metrics for each of the words in the corpus of documents, the domain specificity metric indicative of a relevance of the word in a domain; and
   calculating the proximity score for the topics based on domain specificity metrics of topic words associated with the topics.

5. The method of claim 4, wherein the determining the respective balance scores for each of the topics comprises:
   extracting a subset of words and respective contexts for each of the subset of words from the corpus of documents based on predetermined parameters;
   determining respective impact metrics for each of the subset of words by measuring association between two consecutive words in the context of the word, the impact metric indicative of an impact of the word in the corpus of documents; and
   calculating the balance score for the topic based on domain specificity metrics of topic words associated with the topic and the impact metrics.

6. The method of claim 5, wherein the selecting the relevant topic from the extracted topics further comprises:
   receiving a selection input of topic words associated with one of the extracted topics;
   extracting text segments including the topic words from the corpus of documents;
   displaying the text segments, the proximity score of the topic and the balance score of the topic via a user interface; and
   receiving a determination whether to select the topic as the relevant topic.

7. The method of claim 5, wherein the selecting the relevant topic from the extracted topics further comprises:
   displaying information of each of the extracted topics including the proximity scores and the balance scores of the topics via a user interface; and
   receiving a selection of one of the extracted topics as the relevant topic.

8. The method of claim 1, in response to a request for intent refinement for the relevant topic, the method further comprises:
   obtaining a set of query rules for the relevant topic, the query rule comprising topic words associated with the relevant topic; and
   indexing the corpus of documents by words; and
   utilizing each of the query rules to retrieve respective documents associated with the relevant topic from the indexed corpus.

9. The method of claim 8, wherein the obtaining the query rule for the relevant topic comprises:
   receiving a manual definition of the set of query rules for the relevant topic.

10. The method of claim 8, wherein the feedback data comprises names of refined intents respectively contained in the retrieved documents corresponding to each of the query rules, and the determining the intent information based on the feedback data comprises:

labelling each of the query rules with the name of the refined intent corresponding to the query rule.

11. The method of claim 10, the determining the intent information based on the feedback data further comprises:
ranking the retrieved documents based on relevance of query words in the query rule to the retrieved documents; and
storing the retrieved documents and the rankings of the retrieved document in an intent repository.

12. The method of claim 10, the determining the intent information based on the feedback data further comprises:
classifying text segments in the retrieved documents that contain utterances associated with the refined intent.

13. A method for intent discovery, comprising
receiving multimedia conversation;
selecting a first set of parameter configuration candidates from a parameter repository;
determining whether a relevance criteria is satisfied for each of the first set of parameter configuration candidates by:
converting the multimedia conversation to a text information based on the parameter configuration candidate;
normalizing, by a natural language processing mechanism, the text information into a corpus of documents based on the parameter configuration candidate;
generating a set of word embeddings for words within the corpus of documents;
extracting a set of topics from the corpus of documents based on the parameter configuration candidate;
obtaining respective topic features for each of the set of topics based on the set of word embeddings;
determining respective relevance metrics for each of the set of topics based on the topic features and a topic relevance quantifier, the topic relevance quantifier comprising a machine learning model trained to predict relevance of topics; and
determining whether the parameter configuration candidate satisfies the relevance criteria by comparison of the relevance metrics to the relevance criteria;
in response to satisfaction of the relevance criteria by at least one of the first set of parameter configuration candidates, selecting a parameter configuration candidate best satisfying the relevance criteria from the at least one of the first set of parameter configuration candidates as an optimal parameter configuration;
determining a relevant topic from a set of topics which are extracted from the corpus of documents based on the optimal parameter configuration; and
determining intent information associated with the determined relevant topic.

14. The method of claim 13, wherein the selecting the first set of parameter configuration candidates from the parameter repository comprises:
selecting the first set of parameter configuration candidates from a parameter repository based on a configuration relevance quantifier, the configuration relevance quantifier comprising a machine learning model trained to predict impact of a parameter configuration candidate on relevance of topics to the intent discovery.

15. The method of claim 14, wherein the obtaining the optimal parameter configuration further comprises:
in response to the relevance criteria not being satisfied by any of the first set of parameter configuration candidates,
selecting a second set of parameter configuration candidates from the parameter repository based on the configuration relevance quantifier; and
determining whether the relevance criteria is satisfied for each of the second set of parameter configuration candidates.

16. The method of claim 14, further comprising:
obtaining a plurality of training parameter configurations;
processing the multimedia conversation respectively based on each of the training parameter configurations by:
converting the multimedia conversation to a training text information based on the training parameter configuration;
normalizing, by the natural language processing mechanism, the training text information into a training corpus of documents based on the training parameter configuration;
generating a training set of word embeddings for words within the training corpus of documents; and
extracting a training set of topics from the training corpus of documents based on the training parameter configuration;
obtaining respective training topic features for each of the training set of topics based on the training set of word embeddings;
displaying respective training sets of topics via a user interface;
receiving respective score inputs for each of the topics, the score input indicative of a relevance of the topic to the intent discovery; and
training a machine learning model based on the score inputs and the training topic features to obtain the topic relevance quantifier.

17. The method of claim 16, further comprising:
extracting respective training configuration features from each of the training parameter configurations, the training configuration feature indicative of a value of a parameter in the parameter configuration; and
training a machine learning model based on the score inputs and the training configuration features to obtain the configuration relevance quantifier.

18. A system for intent discovery, comprising:
a processor, the processor configured to:
receive multimedia conversation;
obtain an optimal parameter configuration based on a topic relevance quantifier, the topic relevance quantifier comprising a machine learning model trained to predict relevance of topics;
convert the multimedia conversation to text information based on the optimal parameter configuration;
normalize, by a natural language processing mechanism executable by the processor, the text information into a corpus of documents based on the optimal parameter configuration;
extract topics from the corpus of documents based on the optimal parameter configuration, the topic is associated with a group of topic words;
determine respective context metrics for each of the topics;
select a relevant topic with respect to the intent discovery from the topics based on the respective context metrics;
obtaining documents associated with the relevant topic from the corpus of documents;
display information of the documents associated with the relevant topic via a user interface;

receive, from a graphical user interface accessible by a subject matter expert, a feedback data with respect to the documents associated with the relevant topic, the feedback data comprising sub-topics of the relevant topic and sub-intents for the sub-topics input into the graphical user interface by the subject matter expert; and determine intent information associated with the relevant topic based on the feedback data.

19. A system for intent discovery, comprising:

a processor, the processor configured to:

receive multimedia conversation;

select a first set of parameter configuration candidates from a parameter repository;

for each of the first set of parameter configuration candidates:

convert the multimedia conversation to a text information based on the parameter configuration candidate;

normalize the text information into a corpus of documents based on the parameter configuration candidate;

generate a set of word embeddings for words within the corpus of documents;

extract a set of topics from the corpus of documents based on the parameter configuration candidate;

obtain respective topic features for each of the set of topics based on the set of word embeddings;

determine respective relevance metrics for each of the set of topics based on the topic features and a topic relevance quantifier, the topic relevance quantifier comprising a machine learning model trained to predict relevance of topics; and determine whether the parameter configuration candidate satisfies a relevance criteria is satisfied by comparison of the relevance metrics to the relevance criteria;

in response to satisfaction of the relevance criteria by at least one of the first set of parameter configuration candidates, select a parameter configuration candidate best satisfying the relevance criteria from the at least one of the first set of parameter configuration candidates as an optimal parameter configuration;

determine a relevant topic from a set of topics which are extracted from the corpus of documents based on the optimal parameter configuration; and determine intent information associated with the determined relevant topic.

20. A non-transitory computer readable storage medium comprising computer executable instructions, the instructions executable by a processor to:

receive multimedia conversation;

select a first set of parameter configuration candidates from a parameter repository;

for each of the first set of parameter configuration candidates:

convert the multimedia conversation to a text information based on the parameter configuration candidate;

normalize the text information into a corpus of documents based on the parameter configuration candidate;

generate a set of word embeddings for words within the corpus of documents;

extract a set of topics from the corpus of documents based on the parameter configuration candidate;

obtain respective topic features for each of the set of topics based on the set of word embeddings;

determine respective relevance metrics for each of the set of topics based on the topic features and a topic relevance quantifier, the topic relevance quantifier comprising a machine learning model trained to predict relevance of topics; and determine whether the parameter configuration candidate satisfies a relevance criteria is satisfied by comparison of the relevance metrics to the relevance criteria;

in response to satisfaction of the relevance criteria by at least one of the first set of parameter configuration candidates, select a parameter configuration candidate best satisfying the relevance criteria from the at least one of the first set of parameter configuration candidates as an optimal parameter configuration;

determine a relevant topic from a set of topics which are extracted from the corpus of documents based on the optimal parameter configuration;

determining intent information associated with the determined relevant topic.

* * * * *